March 14, 1950 D. E. MOSES 2,500,853
DUAL OPERATED BRAKE WITH ADJUSTING MEANS
Filed Jan. 24, 1945 2 Sheets-Sheet 1
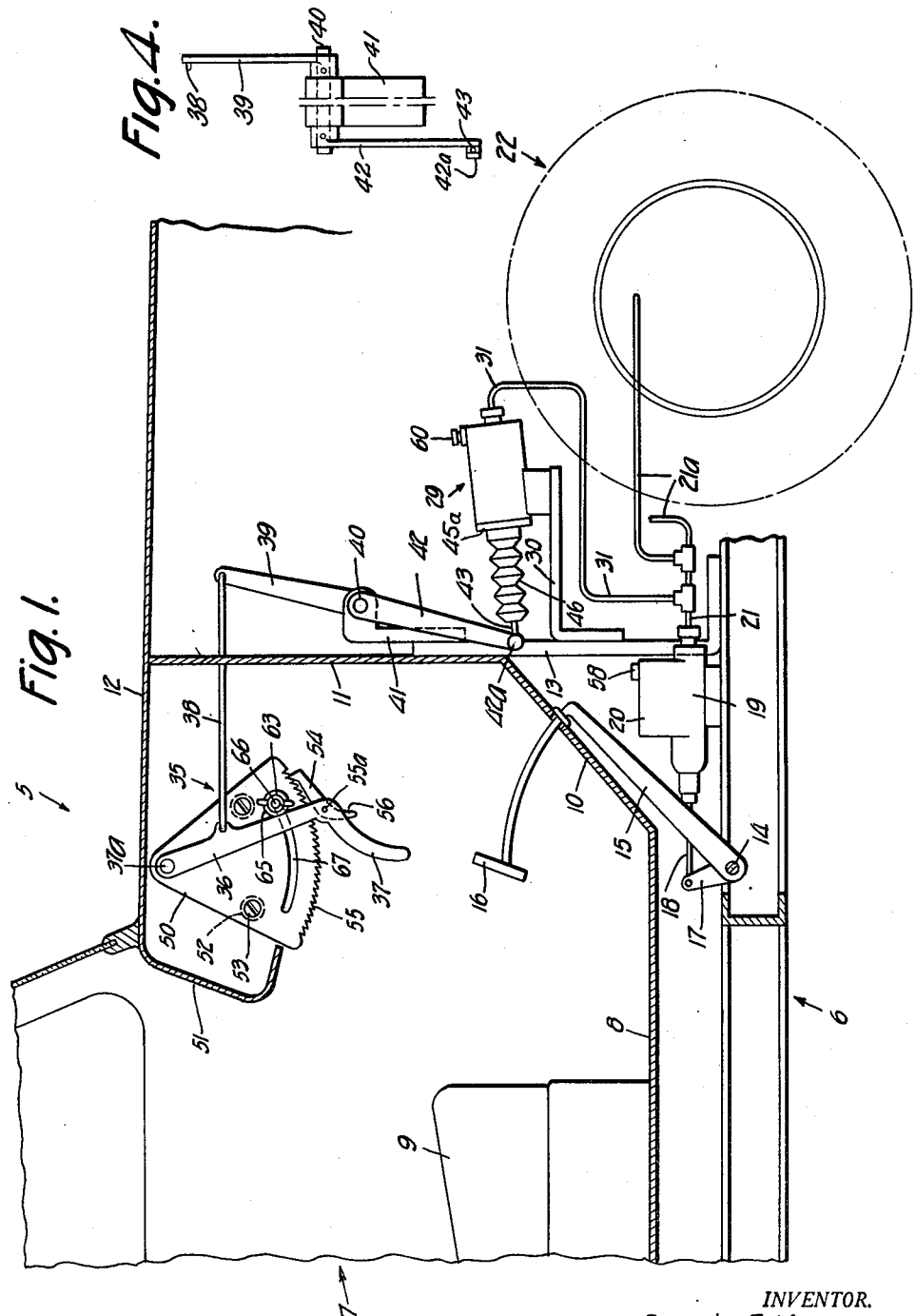
INVENTOR.
Derwin E. Moses
BY John Waldheim
ATTORNEY March 14, 1950 D. E. MOSES 2,500,853
DUAL OPERATED BRAKE WITH ADJUSTING MEANS
Filed Jan. 24, 1945 2 Sheets-Sheet 2
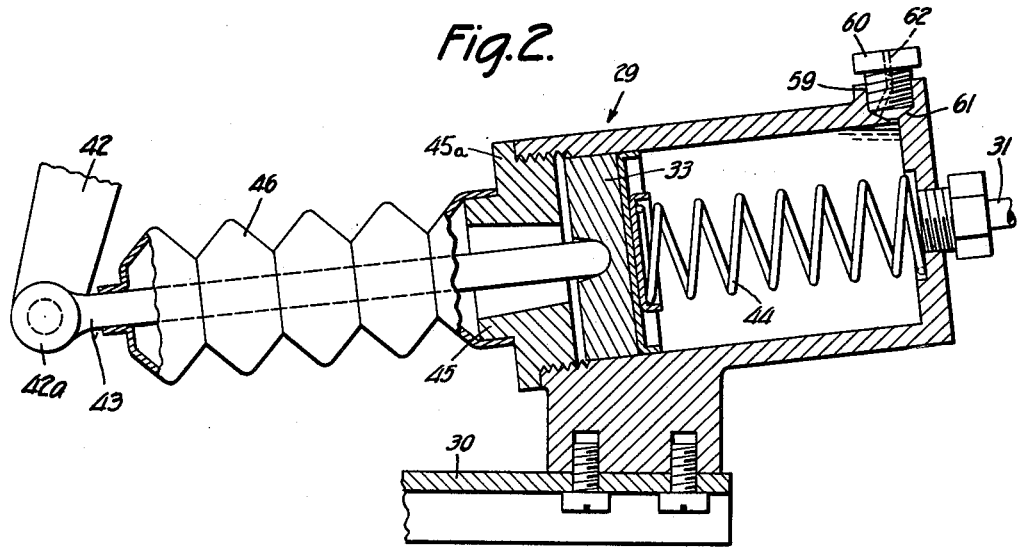
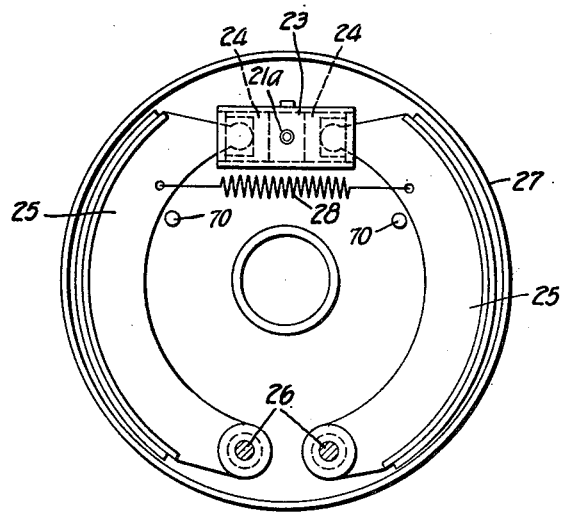
INVENTOR.
Derwin E. Moses
BY John Walaheim
ATTORNEY Patented Mar. 14, 1950

2,500,853

UNITED STATES PATENT OFFICE 2,500,853

DUAL OPERATED BRAKE WITH ADJUSTING MEANS

Derwin E. Moses, Linden, N. J., assignor of one-half to George Grosshans, Linden, N. J.

Application January 24, 1945, Serial No. 574,310

4 Claims. (Cl. 188—106)

This invention relates to improvements in brake systems for motor vehicles and as herein illustrated in combination with hydraulic operating means.

The hydraulic operating means of the brake system now in common use on vehicles such as automobiles comprises a pedal operated master cylinder connected to a plurality of tubular lines, each line extending to a wheel cylinder to operate a pair of brake shoes. The master cylinder, lines and wheel cylinders are ordinarily full of liquid so that a slight movement of the pedal produces a pressure, through the medium of the liquid, to apply the brakes.

As the use of the vehicle continues there is produced in the system an undesired amount of looseness or slack. This may be caused by the wearing of the brakes, the loss of liquid or both. At times the slack becomes so great that the brake pedal reaches the floor board and is stopped thereby without applying the brakes. This condition is usually overcome by adjusting the brakes or by replenishing the hydraulic system with liquid and ordinarily requires the service of a mechanic at a garage or an attendant at a gas station. Such failure of the brake system may occur in a place where there is no garage or gas station available.

The present invention provides means, permanently installed on the vehicle, whereby an adjustment may be made by the driver to correct the deficiency of the brake system, thus avoiding the necessity of driving to a garage or gas station with an automobile having its brake system jeopardized.

A feature of the invention relates to adjusting means in cooperation with the hydraulic system settable successively to a plurality of corrective positions by the driver. This adjusting means includes an adjusting cylinder filled with liquid and having a piston therein which is operable, by means including a manually operable lever, to adjust or advance the piston to a new position in the cylinder at each operation of the lever to force a quantity of liquid from the adjusting cylinder into the brake applying system and thus make up for the deficiency of liquid. Locking means is provided to hold the piston in the various positions to which it may be set.

Decided advantages of the invention are that the mechanism of the novel adjusting means may also be used to apply the brakes, independently of the usual brake pedal in an emergency, and that the brakes may be operated by the adjusting means and maintained applied for an indefinite period, for instance when the vehicle is to be parked.

Another feature of the invention relates to means whereby the novel adjusting means may be relocated in its former state or position of adjustment after it has been actuated therefrom for applying the brakes.

Other features and advantages will hereinafter appear.

In the drawings which form part of the specification;

Fig. 1 is a diagrammatic, sectional side view of a portion of an automobile showing the invention applied thereto;

Fig. 2 is a side view, partly in section, of a cylinder whereby the brake system may be replenished with liquid at will by the driver; and Fig. 3 is a sectional side view showing a brake drum and its associated brakes; and Fig. 4 is a front view of a rock-shaft and two arms thereon forming part of the connecting mechanism between an adjusting cylinder and an adjusting lever.

Similar reference characters represent similar parts throughout the specification.

An automobile 5, to which the invention is applied, includes a chassis 6 above which is supported a body 7 having a floor board 8 upon which is located the driver's seat 9. The floor board has an inclined portion 10 from which a portion 11 extends vertically upward to the upper part of the hood 12. Two L-shaped brackets 13, only one being shown, assist in supporting the body on the chassis.

A rock-shaft 14 is also supported on the chassis and may be actuated about its axis in a clockwise direction, Fig. 1, through the medium of a lever 15 when a pedal 16 thereon is pushed towards the floor section 10. While the rock-shaft 14 is being thus actuated an arm 17 secured thereto pushes a rod 18 forwardly to actuate a piston, not shown, in a master cylinder 19 provided with the usual reservoir 20. By this operation of the piston in the cylinder 19 liquid is forced through a tube 21 and then through tubular lines 21a to each of four wheels 22, only one being shown. Each line 21a is connected to a brake cylinder 23, Fig. 3, located within the usual brake housing. When the liquid is put under pressure pistons 24 are forced outwardly in opposite directions to actuate brake shoes 25 about their pivots 26 and thus apply the brakes by pressing them against the inner surface of a brake drum 27 secured to the wheel 22. A spring 28 connected between the brake shoes 25 tends to release them and this occurs as soon as the pressure is removed from the pedal 16, a small quantity of liquid being forced from each brake cylinder into the lines 21 and a quantity of liquid equal to the total quantity forced from the four brake cylinders is returned to the master cylinder 19. The brake shoes 25 are usually arrested in their released positions by the usual eccentric stops, not shown, and which are not necessary in the present invention. This feature will be explained more clearly hereinafter.

The foregoing is a description of a conventional, hydraulic brake system for automobiles which usually require the services of a garage mechanic to make adjustments such as taking up of the brakes or replenish the liquid in the system.

The novel means for readily making such adjustments by the driver of the automobile will now be described. It includes an adjusting cylinder 29 rigidly supported by a bracket 30 on one of the brackets 13. The cylinder 29 is filled with liquid and is connected to the hydraulic brake system, by means of a tubular line 31 attached to the tubular section 21 extending from the master cylinder 19 to the lines 21a. The adjusting cylinder 29 has therein a piston 33, Fig. 2, by which liquid may be forced from this cylinder 29 to replenish the hydraulic system after its quantity of fluid becomes deficient, either by the loss of fluid or by the wearing of the brake shoes 25, the deficiency being made manifest by the extent of movement of the brake pedal 16 towards the floor board section 10. In other words as the deficiency of the fluid in the hydraulic system increases the pedal 16, when operated by the foot of the driver, moves closer to the floor board section 10 and may under certain conditions reach the floor board without applying the brakes as previously stated, the normal extent of movement required of the pedal to apply the brakes being about one quarter of the distance from its normal position to the floor board section 10.

The adjusting means further includes actuating means 35 whereby the piston 33 in adjusting cylinder 31 may be successively advanced or adjusted to various positions, from one end towards the other end of the cylinder, to replenish the hydraulic system as required from time to time.

This actuating means 35 includes a lever 36 having a downwardly extending handle 37 within view and reach of the driver from his seat 9. By pulling the handle 37 towards him the driver operates the lever 36 about a fixed pivot 37a to pull a link 38 connected to an upwardly extending arm 39 located substantially in the same plane as the lever 36 and secured to a rock-shaft 40 to actuate the latter about its axis in a counter-clockwise direction, Fig. 1. The rock-shaft 40 is supported in a fixed bracket 41 and extends to the other side of said bracket where it has secured thereto a downwardly extending arm 42 which pushes a rod 43, through the medium of a headed pin 42a, to actuate the piston 33 of cylinder 29 rightwardly in Fig. 2 against the actuation of a return spring 44 to thus force liquid from the adjusting cylinder through the line 31.

The left end of the adjusting cylinder 31, Fig. 2, is provided with a plug 45a against which the piston 33 may be arrested in its extreme leftward position. This plug is provided with an outward extension 45, Fig. 2, to which is attached one end of a collapsible boot 46 which prevents dust from entering the cylinder 31, the other end of the boot being attached to the rod 43.

The pivot 37a of lever 36 is secured to the upper end of a plate or quadrant 50 which is located behind the dash 51 and is secured to the inner side of the body by screws or bolts 52 cooperating with collars 53 which hold the quadrant spaced the proper distance from the wall of the body 7. While the lever 36 is being operated in a clockwise direction, Fig. 1, a spring pressed holding pawl 54 snaps over teeth 55 formed on the lower edge of the quadrant 50. The pawl is supported on the lever 36 by a pivot pin 55a and is provided with a finger-piece 56 which may be readily engaged and operated by the index finger of the driver, while holding the handle 37 with the hand. This operation releases the pawl 54 from the quadrant when it is desired to return the lever 36 toward its normal or home position.

The vent plug which is usually used at the top of the reservoir 20 associated with the master cylinder may be replaced by a seal plug 58.

The filling of the system with liquid after all possible adjustments have been made by lever 36 may be accomplished through an opening 59 in the adjusting cylinder 29 into which there is threaded a vent plug 60 which when screwed down against a seat 61 serves as a seal plug. The adjusting cylinder 29 is inclined slightly so that air in the system will find its way to the corner of the cylinder in which the plug 60 is located and then up through a hole 62 in the plug while the plug is unseated.

It should be understood that with the present invention inspection of the brakes and the quantity of liquid in the system is required less frequently than heretofore and only when the lever reaches its farthest position lengthwise of the quadrant 50. Thus the lever serves also to indicate when the system requires inspection by a mechanic.

In order to use the means of the present invention to apply and lock the brakes for parking purposes it is merely necessary to pull the handle 37 to actuate the lever 36 and consequently the piston 33 from their previously adjusted positions as far as they will go thus forcing additional liquid from the cylinder 29 into the brake cylinders 23 to force the shoes 25 against the drums 27. In the meantime the pawl 54 cooperates with the teeth 55 to lock the lever 36 in its brake applying position to keep the brakes applied.

When the brakes are to be released after being used for parking the adjusting lever 36 is moved back to the position to which it had previously been moved to replenish the hydraulic system. To facilitate locating the adjusting lever and the piston 32 in their previous replenishing positions there is provided means herein shown as a stop 65 against which the lever 36 is moved. The stop is in the form of a collar through which a bolt 66 extends. The bolt 66 also extends through a slot 67 in the plate 50 and is provided with a head engaging the far side of the plate 50, Fig. 1. The near end of the bolt, has threaded thereon a wing nut 63 by which the stop 65 may be clamped tightly against the side of the plate 50.

Whenever the lever 36 is moved to a new position to make an adjustment of the hydraulic system the stop 65 is loosened by unscrewing the wing nut, the bolt 66 is then moved lengthwise of the slot until the stop 65 is arrested against the lever 36 in its new position, the wing nut 63 is then tightened to clamp the stop 65 in the position to which it has been shifted. Each time a subsequent adjustment of the hydraulic system is made by the lever 36 a corresponding adjustment of the stop 65 follows. It will be understood that without the use of this novel means, stop 65, it would be practically impossible to relocate the lever 36 and piston 33 in their previously adjusted positions after using them to apply and then release the brakes.

To arrest the brake shoes 25 in their released position in the present invention the quantity of liquid remaining in the brake cylinders 23 is relied upon instead of the adjustable eccentric stop used heretofore. Two fixed stops 70 are employed however engaged by the brake shoes to limit the action of the spring 28 during the assembling of the parts. After the liquid is introduced into the system and the brakes 25 and the piston 33 in the adjusting cylinder have been set in their proper position the shoes no longer cooperate with the stops 70.

It should be understood that the present invention may be in the form of an accessory to be applied to automobiles already in use or it may be supplied as part of the regular equipment of new cars. When built into new cars the usual parking brake mechanism is not necessary since the mechanism of the present invention may be used for that purpose in addition to its primary use namely that of adjusting the brake system.

If desired, the hand operated brake lever 36 may be used instead of the pedal lever 15 to apply the brakes while the car is running. This is especially advantageous and serves as a safety means in case of failure of the pedal 16 to apply the brakes which may be due to breakage of some of the operating parts between the pedal 16 and the cylinder 19. In an emergency both manually operated lever 36 and pedal 16 may be operated simultaneously to apply the brakes, thus supplying more power than can be supplied by either, (lever 36 and pedal 16) individually.

It will further be understood that an automobile provided with means including this invention requires less attention at a garage or service station and it makes for greater safety on the highways.

While certain preferred embodiments of the invention have been described it will be understood that certain parts may be used with others and that changes in the form, arrangement, proportions, sizes and details thereof may be made without departing from the scope of the invention as defined in the appended claims.

I claim:

1. In a vehicle, the combination with brakes and brake applying means including a hydraulic system having a master cylinder with a piston therein operable by a pedal to force liquid from said cylinder through a plurality of lines, each line being connected with a brake operating mechanism so that the latter may be operated to apply the brakes of the associated wheel, of adjusting means cooperating with the hydraulic system and settable to take up slack in that portion of said system between the pedal and the brake operating means, and means to lock the settable means in the various positions to which it may be set, the adjusting means including a fixed plate, a pivot on said plate, a lever extending downwardly from said pivot, a handle on the lower end of said lever by which it may be actuated by said pivot, a link operable by said lever, a lever of the first order operable by said link, a cylinder, a line connecting said cylinder with the hydraulic system, a piston in the last mentioned cylinder, a rod actuable by said lever to operate the last mentioned piston to make up a deficiency of liquid in the hydraulic system, a locking pawl on said lever, and a rack on said plate engaged by said pawl.

2. In a brake applying means for the wheels of a vehicle, the combination of a cylinder, a piston in said cylinder, a brake applying lever located at a higher level than the cylinder, a handle on the lower end of said lever, a pivot at the upper end of said lever, a link connected to said lever and extending forwardly therefrom, a horizontally disposed rock-shaft extending transversely of the vehicle, an upwardly extending arm secured to the rock-shaft at one end thereof, said arm being located substantially in the same plane as said lever and its upper end being connected to the forward end of said link, a downwardly extending arm secured to said rock-shaft and located in another plane parallel to the one in which the upwardly extending arm is located, and a rod connected to the lower end of the downwardly extending arm and operable by the latter to actuate said piston.

3. In a brake applying means for the wheels of a vehicle, the combination of a cylinder, a piston in said cylinder, a lever located at a higher level than the cylinder, a connecting element extending forwardly from said lever, horizontally disposed means extending transversely of the vehicle, means to pivotally support the horizontally disposed means, an upwardly extending arm at one end of the horizontally disposed means, the upper end of said arm being connected to said connecting element, a downwardly extending arm on the other end of said horizontally disposed means, and a rod connected to the lower end of said downwardly extending arm and operable by the latter to actuate said piston.

4. In a brake applying means for the wheels of a vehicle, the combination of a cylinder, a piston in said cylinder, a lever located at a higher level than the cylinder, a connecting element extending forwardly from said lever, intermediate, downwardly extending means, means to pivotally support the intermediate means between its ends, the upper end of the intermediate means being connected to said connecting element, the lower end of the intermediate means being located to one side of a vertical, longitudinal extending plane in which the upper end of the intermediate means is located, and a rod operable by the lower end of the intermediate means to actuate said piston.

DERWIN E. MOSES.

REFERENCES CITED

The following references are of record in the file of this patent:

UNITED STATES PATENTS

| Number | Name | Date |
|---|---|---|
| 287,779 | Runstetler | Oct. 30, 1883 |
| 1,341,325 | Kainen | May 25, 1920 |
| 1,617,020 | Merwin | Feb. 8, 1927 |
| 1,815,157 | Loughead | July 21, 1931 |
| 1,857,413 | Tatter | May 10, 1932 |
| 1,991,603 | Dick | Feb. 19, 1935 |
| 2,037,868 | Wall | Apr. 21, 1936 |
| 2,140,751 | La Brie et al. | Dec. 20, 1938 |
| 2,356,517 | Hale | Aug. 22, 1944 |

FOREIGN PATENTS

| Number | Country | Date |
|---|---|---|
| 236,584 | Great Britain | Nov. 3, 1926 |